United States Patent [19]

Harasin et al.

[11] Patent Number: 5,368,806
[45] Date of Patent: Nov. 29, 1994

[54] PRODUCTION OF MOLDINGS BY THE REACTION INJECTION MOLDING PROCESS

[75] Inventors: Stephen J. Harasin, Morgan; Jan L. R. Clatty, Monaca, both of Pa.

[73] Assignee: Miles Inc., Pittsburgh, Pa.

[21] Appl. No.: 972,197

[22] Filed: Nov. 5, 1992

[51] Int. Cl.⁵ ............................................. B29C 45/00
[52] U.S. Cl. ........................... 264/328.6; 264/331.19; 528/75
[58] Field of Search ............. 264/328.6, 328.1, 331.19; 528/75

[56] References Cited

U.S. PATENT DOCUMENTS

| | | |
|---|---|---|
| Re. 33,609 | 6/1991 | Nodelman ........................ 264/53 |
| 3,666,726 | 5/1972 | Grogler et al. .................. 528/75 |
| 3,691,112 | 9/1972 | Grogler et al. .................. 528/75 |
| 4,218,543 | 8/1980 | Weber et al. .................... 521/51 |
| 4,333,067 | 6/1982 | Kugimiya et al. ............... 338/34 |
| 4,396,729 | 8/1983 | Dominquez et al. ............ 521/51 |
| 4,444,910 | 4/1984 | Rice et al. ...................... 521/51 |
| 4,530,941 | 7/1985 | Turner et al. ................... 521/176 |
| 4,552,945 | 11/1985 | Alberino et al. ................ 264/328.6 |
| 4,636,531 | 1/1987 | Schmidt et al. ................. 264/328.6 |
| 4,774,263 | 9/1988 | Weber et al. .................... 521/51 |
| 4,774,264 | 9/1988 | Weber et al. .................... 521/51 |
| 4,792,576 | 12/1988 | Nodelman ....................... 521/174 |
| 4,882,361 | 11/1989 | Ruckes et al. ................... 264/328.6 |
| 4,965,293 | 10/1990 | Sanns, Jr. ....................... 264/328.6 |
| 4,983,643 | 1/1991 | Sanns, Jr. ....................... 264/328.6 |
| 5,066,824 | 11/1991 | Mafoti et al. ................... 560/44 |
| 5,084,487 | 1/1992 | Becker et al. ................... 264/328.6 |

FOREIGN PATENT DOCUMENTS

| | | | |
|---|---|---|---|
| 0024330 | 3/1981 | European Pat. Off. ......... | 264/328.1 |
| 59-145129 | 8/1984 | Japan .............................. | 264/328.1 |
| 61-020717 | 1/1986 | Japan .............................. | 264/328.1 |
| 61-176623 | 8/1986 | Japan .............................. | 264/328.1 |

*Primary Examiner*—Allan R. Kuhns
*Attorney, Agent, or Firm*—Joseph C. Gil; N. Denise Brown

[57] ABSTRACT

Products having improved green strength, improved physical properties and improved thermal properties are prepared via the RIM process using a reaction mixture containing an isocyanate, a specific low molecular weight diol or triol, and a specified amine terminated material.

4 Claims, No Drawings

PRODUCTION OF MOLDINGS BY THE REACTION INJECTION MOLDING PROCESS

See U.S. application Ser. No. 523,769, filed on May 15, 1990. In addition, U.S. Pat. No. 5,066,824 relates to production techniques for similar compounds which can contain aliphatic as well as aromatic bound amine groups. The use of these amine compounds in a RIM process has been described in U.S. application Ser. No. 07/699,529, filed on May 14, 1991 (which in turn was a continuation-in-part of U.S. application Ser. No. 07/586,971, filed on Sep. 26, 1990) and U.S. application Ser. No. 07/805,735, filed on Dec. 9, 1991. In general, the systems described in the '529 and '971 applications do not include any hydroxy-functional reactants.

BACKGROUND OF THE INVENTION

Reaction injection molded (RIM) polyurethanes are well known in the art and have met with substantial commercial success. U.S. Pat. No. 4,218,543 describes the use of relatively high molecular weight hydroxyl group containing materials, aromatic diamines as chain extenders, and isocyanates for the production of RIM parts. U.S. Pat. No. 4,792,576 (and the corresponding Reissue U.S. Pat. No. 33,609) describes RIM systems based upon the use of specific polyol blends.

More recently, the activity in the art has been towards the production of polyurea RIM parts. Typically, these parts are made from relatively high molecular weight polyethers which contain amine groups, diamine chain extenders, and isocyanates. Typical of the materials used and the technologies known in the art are those described in U.S. Pat. Nos. 4,396,729, 4,433,067, 4,444,910, 4,530,941, 4,774,263 and 4,774,264.

Recently, novel amine compounds and processes for their production have been discovered. These compounds correspond to the formula:

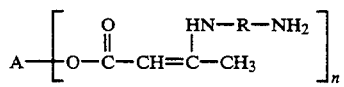

wherein

A represents the polyfunctional radical left by the removal of the hydroxyl groups from a polyol of molecular weight of from 62 to 12,000, and preferably from about 800 to about 3500 and functionality n, R represents an arylene radical of from 6 to 21 carbon atoms, and n is an integer of from 2 to 6, preferably from 2 to 4.

The present invention is directed to the discovery that the novel amine compounds noted are eminently suitable for use in a RIM process in combination with specific hydroxy-functional materials.

DESCRIPTION OF THE INVENTION

The present invention is directed to a process for making a reaction injection molded elastomer comprising injecting a reaction mixture into a closed mold via a RIM machine with the ratio of components being such that the isocyanate index is from about 70 to about 130. The reaction mixture comprises:

a) an organic di- and/or polyisocyanate,
b) an isocyanate reactive mixture comprising:
1) from 30 to 70 parts, and preferably from 30 to 55 parts by weight of a hydroxyl functional organic material which does not contain any nitrogen atoms and which contains from 3 to 4 hydroxyl groups and having a molecular weight below 350,
2) from 0 to 35 parts, and preferably from 25 to 35 parts by weight of a hydroxyl functional material containing from 1 to 4 hydroxyl groups and having a molecular weight of from 284 to 602, and prepared by reacting an amine-group containing material selected from the group consisting of aromatic monoamines, aliphatic monoamines, aromatic diamines, aliphatic diamines, monoalkanol amines, dialkanolamines or mixtures thereof with one or more alkylene oxides,
3) from 0 to 15 parts, and preferably from 10 to 15 parts by weight of a polyester diol prepared by reacting an aliphatic carboxylic acid with an aliphatic diol, said polyester having an OH number of from about 60 to about 250, and preferably from about 112 to about 225, and
4) from 15 to 40 parts by weight, and preferably from 20 to 30 parts by weight of a compound of the formula:

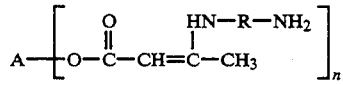

wherein

A represents the polyfunctional radical left by the removal of the hydroxyl groups from a polyol of molecular weight of from 62 to 12,000 and preferably from about 800 to about 3500 and functionality n, R represents a hydrocarbon radical, and n is an integer of from 2 to 6, preferably from 2 to 4.

R may be aromatic, aliphatic or cycloaliphatic and is preferably a hydrocarbon radical selected from the group consisting of an arylene radical of from 6 to 21 carbon atoms, a straight or branched chain alkylene radical of from 2 to 20 carbon atoms, a cycloalkylene radical of from 3 to 20 carbon atoms, a $C_7$ to $C_{20}$ alkylarylene radical, and a $C_7$ to $C_{20}$ aralkylene radical, with the proviso that 1) the amine groups must be separated by 2 or more than 3 carbon atoms if R is an alkylene or aralkylene radical and 2) the amine groups can not be in ortho positions to each other if R is an arylene or alkylarylene radical. R is most preferably an aliphatic radical of from 5 to 12 carbon atoms.

The systems yield products having improved green strength, improved physical properties including impact strength, and improved thermal properties such as heat distortion temperatures and heat sag. It was surprisingly found that a lower molecular weight amine (i.e., component 4)) achieved better overall physical properties when compared to a higher molecular weight aliphatic polyether amine of the type generally used in RIM processes (i.e., Jeffamine polyamines). In other words, for a given Jeffamine-type, a lower molecular weight amine (i.e., component 4)) can be used to obtain better overall properties.

As used herein, the term "arylene" is intended to mean a divalent radical derived from an aromatic hydrocarbon (which can be monoaromatic, diaromatic or polyaromatic) by removal of a hydrogen atoms from each of two carbon atoms of the aromatic moiety. Specific examples include tolylene, phenylene, naphthylene, diphenylene, and the like. As used herein, the term is also intended to include diaromatic radicals such as methylenebis(phenyl), isopropylenebis(phenyl) and the like. The key is that both of the nitrogen atoms of the above formula be directly attached to an aromatic radical. As noted above, the amine groups can not be in ortho positions to each other.

As used herein, the term "alkylene" is intended to mean a divalent radical derived from an aliphatic hydrocarbon by removal of a hydrogen atom from each of two carbon atoms of the aliphatic moiety. Specific examples include ethylene, butylene, and the like. As noted above, the amine groups must be separated by 2 or more than 3 carbon atoms.

As used herein, the term "cycloalkylene" is intended to mean a divalent radical derived from a cycloaliphatic hydrocarbon by removal of a hydrogen atom from each of two carbon atoms of the cycloaliphatic moiety. Specific examples include cyclobutylene, cyclopentylene, cyclohexylene and the like.

As used herein, the term "alkylarylene" is intended to mean a divalent radical derived from an aromatic hydrocarbon (which can be monoaromatic, diaromatic or polyaromatic) which is substituted with one or more alkyl groups by removal of a hydrogen atom from each of two carbon atoms of the aromatic moiety. As noted above, the amine groups can not be in ortho positions to each other.

As used herein, the term "alkylene" is intended to mean a divalent radical derived from an aliphatic hydrocarbon which is substituted with one or more aryl groups by removal of a hydrogen atom from each of two carbon atoms of the aliphatic moiety. As noted above, the amine groups must be separated by 2 or more than 3 carbon atoms.

The amine compounds 4) useful herein are prepared by reacting a polyfunctional acetoacetic acid ester with an organic compound which contains two primary amino groups. The reaction may be conducted in the presence of a solvent and an acidic catalyst selected from the group consisting of (i) boron trifluoride etherate and (ii) organic acids having pKa values of from 0.1 to 0.8. In the case of aromatic amines, a catalyst is essential. By this invention, it is possible to produce a wide variety of different amines having a wide variety of different reactivities by selection of the primary amino compound used in the preparation thereof.

The polyfunctional acetoacetic acid esters useful herein are produced by techniques generally known in the art. For example, the acetoacetic acid esters may be produced according to the processes described in U.S. Pat. Nos. 3,666,726 and 3,691,112, the disclosures of which are herein incorporated by reference.

In general, the acetoacetic acid esters can be produced by reacting polyols with diketenes, or by transesterifying alkylacetoacetates with polyols. The transesterification technique is the presently preferred technique. In general, the transesterification reaction is conducted at temperatures ranging from 100° to 210° C. for periods of time ranging from 2 to 8 hours.

If desired, transesterification catalysts, such as dibutyltin oxide and tetrabutyl titanate, can be used.

The polyols useful in producing the polyfunctional acetoacetic acid esters are of the type generally used in polyurethane chemistry. The polyols useful herein typically have molecular weights of from 62 to 12,000, preferably from about 800 to about 3500 and have hydroxyl functionalities of from 2 to 6, preferably from 2 to 4. Examples of suitable compounds include the polyesters, polyethers, polythioethers, polyacetals, polybutadienes and polycarbonates containing 2 to 6 hydroxyl groups of the type known for the production of polyurethanes. The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols, triols and tetrols, 4,4'-dihydroxy diphenyl propane, sorbitol, aniline, ammonia, ethanolamine and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied polyols which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Polyols useful herein also include materials which are typically used as chain extenders in polyurethane chemistry. Examples of such materials include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol, trimethylol propane, and pentaerythritol.

The polyfunctional acetoacetic acid esters are preferably prepared by transesterifying any of the above noted polyols with lower alkyl acetoacetates. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the acetoacetic acid esters herein, transesterification catalysts may be necessary. In preparing the polyfunctional acetoacetic acid esters, it is generally preferred that the reactants be used in amounts such that one OH group is present for each acetoacetate group. However, it is also possible to use excess amounts of either reactant. In fact, in some cases it is preferred to use an excess of the acetoacetate to ensure complete reaction.

The polyfunctional acetoacetic acid ester is then reacted with a primary diamine.

The solvents which can be used herein are of the same type described in U.S. Pat. Nos. 3,666,726, and 3,691,112. Preferred solvents are those that form azeotropes with water. Suitable solvents include methylene chloride, chloroform, chlorobenzene, dichlorobenzenes, toluene, xylenes, ethylacetate, propylacetate, butylacetate, diethylether, dibutylether, and the like. Toluene is the presently preferred solvent. The amount of solvent is generally selected so as to be sufficient for dissolving the starting materials. In general, the solvent is used in a quantity of from 20 to 500, and preferably from 50 to 200 parts by weight per 100 parts by weight of the polyfunctional acetoacetic acid ester.

The catalyst, if used, is selected from the group consisting of boron trifluoride etherate and organic acids having pKa values of from 0.1 to 0.8. It has been found that use of catalysts having pKa values outside the range noted leads to side reactions which lead to solid products. In addition, only the catalysts noted lead to commercially acceptable yields. Of the acids tested, only trifluoroacetic acid (pKa: 0.23) and p-toluene sulfonic acid (pKa: 0.7) were found useful in preparing amines from aromatic amine compounds. The amount of catalyst is generally selected so as to be sufficient to allow reasonable reaction times. In practice, the catalyst is added in amounts of from 0.05 to 2.0 mole %, and preferably from 0.3 to 1.0 mole %, based on the equivalents of acetoacetate present. This corresponds to from 0.01 to 0.2% by weight, and preferably from 0.05 to 0.1% by weight based on the weight of the polyfunctional acetoacetic acid ester.

Useful amines which are to be reacted with the polyfunctional acetoacetic acid esters are primary aliphatic, cycloaliphatic and aromatic diamines. Specific amines include diethyltoluene diamine and the various isomers and isomer mixtures thereof; toluene diamine and the various isomers and isomer mixtures thereof; methylenebis(phenyl amine) and the various isomers and isomer mixtures thereof; 1,5-naphthalene diamine; t-butyl toluene diamine, and the various isomers and isomer mixtures thereof; di-t-butyl toluene diamine, and the various isomers and isomer mixtures thereof; methylenebis(o-dichloroaniline) ("MOCA"); 2,4-diaminoalkylbenzenes, and homologues and isomers thereof having alkyl radicals of from 8 to 15 carbon atoms as described in published European Patent Application 58,368; ethylene diamine; the various straight and branched chain isomers of diaminobutane, diaminopentane, diaminohexane, diaminoheptane, diaminooctane, diaminononane, and diaminodecane; the various isomers of diaminocyclobutane, diaminocyclopentane, diaminocyclohexane, diaminocycloheptane, diaminocyclooctane, diaminocyclononane, diamino-1-methylcyclohexane, methylenebis(cyclohexyl amine), diamino-1-methylcyclopentane, diaminodimethylcyclohexane; isophorone diamine; and the like. One presently preferred aliphatic diamine is 1,5-diamino-2-methylpentane.

The amount of amine is generally selected so that one mole of diamine is available for every acetoacetate equivalent. It is of course possible to react less than one mole diamine with one equivalent of acetoacetate. This might result in a lower conversion if the reaction is terminated before all acetoacetate groups have reacted with amine groups, or in chain extension if all acetoacetate groups have reacted. On the other hand, in order to suppress chain extension and to obtain low viscosity products, it might be advantageous to use more than one mole diamine per equivalent of acetoacetate. The unreacted diamine can either be stripped off once the reaction is complete, or can remain in the product to serve as a chain extender, i.e., in a reaction with isocyanates.

The reaction is generally carried out at temperatures of from 40° to 200° C., preferably from 90° to 140° C., under excess pressure, reduced pressure, or, preferably, in the substantial absence of pressure. The process can be conducted continuously or discontinuously. In general, the acetoacetic acid ester, the amines, and the catalyst are dissolved in the solvent. The reaction mixture is refluxed while the water of reaction is collected. When no more water comes off, the reaction is considered complete. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled.

The isocyanate (component a)) used in the process of the present invention is preferably an aromatic diisocyanate and/or polyisocyanate, i.e., a polyisocyanate in which all of the isocyanate groups are aromatically bound. Examples of such compounds include 2,4- and/or 2,6-diisocyanatotoluene; 2,2'-, 2,4'- and/or 4,4'-diisocyanatodiphenyl methane, mixtures of the last-mentioned isomers with their higher homologues (such as are obtained from the known reaction of the phosgenation of aniline/formaldehyde condensates); compounds containing urethane groups obtained as products of reaction of the above-mentioned di- and/or polyisocyanates with subequivalent quantities of polyhydroxyl compounds having molecular weights of from 62 to 10,000, (e.g., ethylene glycol, trimethylol propane, propylene glycol, dipropylene glycol or polypropylene glycols, and polyester glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Specification No. 0,024,665); or mixtures of such aromatic di- and polyisocyanates. Also useful are the so-called "modified" polyisocyanates. These modified isocyanates are generally known in the art and typically contain urethane, urea, carbodiimide, isocyanurate, allophanate, and/or biuret groups.

Included among the preferred isocyanates are the derivatives of 4,4'-diisocyanatodiphenyl methane which are liquid at room temperature. Specific examples of such compounds are polyisocyanates containing urethane groups obtainable according to German Patent 1,618,380 (U.S. Pat. No. 3,644,457) by reacting 1 mole of 4,4'-diisocyanatodiphenyl methane with from 0.05–0.3 mole of low molecular weight diols or triols, (preferably polypropylene glycols having molecular weights below 700); diisocyanates based on 4,4'-diisocyanatodiphenyl methane containing carbodiimide and/or uretoneimine groups, such as those disclosed in U.S. Pat. Nos. 3,152,162; 3,384,653 and 3,449,256, German Offenlegungsschrift No. 2,537,685 and European Specification No. 5233 (U.S. Ser. No. 903,308). Also included among the preferred polyisocyanates are the corresponding modified products based on mixtures of 2,4'- and 4,4'-diisocyanatodiphenyl methane or mixtures of the above-described modified 4,4'-diisocyanatodiphenylmethanes with minor quantities of higher than difunctional polyisocyanates of the diphenyl methane series. Such polyisocyanates are described in German Offenlegungsschrift 2,624,526. The preferred polyisocyanate mixtures of the diphenyl methane series are liquid at room temperature and have optionally been chemically modified as described above, with an average isocyanate functionality of from 2 to 2.8 (preferably from 2.1 to 2.7) containing 4,4'-diisocyanatodiphenyl methane as the main component (amounting to more than 40 wt. %).

The hydroxy functional reactants (i.e., components (b) 1), 2) and 3) are all known in the polyurethane art. Useful low molecular weight (i.e., molecular weights of below 350) are described in U.S. Pat. No. 4,792,576, the disclosure of which is herein incorporated by reference. The useful polyesters are prepared as described above regarding the preparation of the amine components. All that is necessary is that the various molecular weight and OH number limitations be met.

Known mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 1,365,215), German Offenlegungsschrift 2,431,968 (U.S. Pat. No. 4,098,731), German Offenlegungsschrift 2,404,310 (U.S. Pat. No. 4,058,492) and U.S. Pat. Nos. 4,519,965 and 4,581,386 are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes. Also preferred are the zinc salts described in U.S. Pat. Nos. 4,519,965 and 4,581,386.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono- and/or polyisocyanates (according to German Offenlegungsschrift 2,356,692 (U.S. Pat. No. 4,033,912); esters of mono- and/or polycarboxylic acids and polysiloxanes containing hydroxyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups. However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethylmorpholine, N-cocomorpholine, N,N,N',N'-tetramethylethylene diamine, 1,4-diazabicyclo-(2,2,2)-octane, N-methyl-N' -dimethylaminoethyl piperazine, N,N-dimethylbenzylamine, bis-(N,N-diethylamino)-adipate, N,N-diethyl benzylamine, pentamethyl diethylene triamine, N,N-dimethylcyclohexylamine, N,N,N',N'-tetramethyl-1,3-butanediamine, 1,2-dimethylimidazole and 2-methylimidazole.

Organometallic catalysts may also be used in the practice of the present invention. Particularly useful organometallic catalysts include organic tin catalysts such as tin(II) salts of carboxylic acids (e.g., tin-(II)-acetate, tin-(II)-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component c)) are appropriate.

The products of the process of the present invention are molded articles. Blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorofluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as ricinoleic acid or polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate and polyphosphate), stabilizers against aging and weathering, plasticizers, fungistatic and bacteriostatic substances, and fillers (such as barium sulfate, glass fibers, kieselguhr or whiting).

Other examples of suitable surface active additives and foam stabilizers, flame retardants, plasticizers, dyes, fillers and fungistatic and bacteriostatic substances and details concerning the use of mode of action of these additives may be found in Kunststoff Handbuch, Volume VII, published by Vieweg and Hochtlen, Carl Hanser Verlag, Munich 1966, e.g., on pages 103 to 113.

When carrying out the process of the present invention, the quantity of polyisocyanates (component a)) should preferably be such that the isocyanate index is from 70 to 130, most preferably 90 to 110 in the reaction mixture.

The process of the present invention is carried out by the known reaction injection molding technique (RIM process). Two streams are generally employed in this molding technique. In the present invention, the polyisocyanate (component a)) is the first reactant and the mixture of components b) 1) through 4) is the second reactant. If any auxiliary agents or additives are used, they are generally mixed with the isocyanate reactive component. However, it may be advantageous, for example when using a mold release agent containing isocyanate groups, to incorporate the release agent with the reactant polyisocyanate (component a)) before the process of the present invention is carried out. It is possible in principle to use mix heads in which three or four separate components may be simultaneously introduced so that no preliminary mixing of the individual components is required. The quantity of reaction mixture introduced into the mold is generally calculated to produce molded articles having densities of from 0.8 to 1.4 g/cm$^3$, preferably from 0.9 to 1.2 g/cm$^3$. When mineral fillers are used, however, the molded articles may have densities above 1.2 g/cm$^3$. The articles may be removed from the mold after they have been left in there from 10 to 90 seconds, preferably from 20 to 60 seconds.

The reaction mixture is generally introduced into the mold at a starting temperature of from 10° to 60° C., preferably from 20° to 50° C. The temperature of the mold itself is generally from 40° to 100° C., preferably from 50° to 70° C.

The molded articles obtainable by the process of the present invention are particularly suitable for the manufacture of computer and medical instrument cabinets, window frames, automotive parts such as window frames, instrument panels and door frame, and appliance housings.

The invention is further illustrated but is not intended to be limited by the following examples in which all parts and percentages are by weight unless otherwise specified.

PREPARATION OF POLYAMINE A

The apparatus used consisted of (i) a vacuum jacketed distillation column with metal packing, (ii) a variable reflux ratio distilling head with a round bottom flask attached to receive butanol and excess butyl acetoacetate, (iii) a five liter three neck flask, and (iv) a thermoregulator and a heating mantle.

The five liter flask was charged with about 846 parts of a 2000 molecular weight polyoxypropylene glycol, and nitrogen was bubbled through the flask. The temperature was raised to 130° C. 214 parts of t-butyl acetoacetate were charged into an addition funnel and added to the flask dropwise. At the completion, the temperature was raised to 160° C. About 63 parts of t-butanol were collected in the receiving flask. Once the t-butanol stopped coming off, vacuum was slowly applied to remove residual t-butanol and unreacted t-butyl acetoacetate (about 80 parts). The progress of the reaction was monitored using IR, with the disappearance of the hydroxyl peak around 3500–3400$^{-1}$ indicating completion of the reaction.

The three neck flask was charged with the acetoacetylated product, and 98 parts of 1,5-diamino-2-methylpentane. The flask was fitted with a Dean Stark trap so as to collect water generated from the reaction. The reaction was stirred and nitrogen was bubbled through. The temperature was raised to 115°–120° C. The reaction progress was monitored by the amount of water collected. Once water was no longer being collected, the Dean Stark trap was replaced with a condenser and the toluene was removed by distillation. Vacuum was applied to the system to ensure total removal of toluene and catalyst. The amount of water collected was 15 parts. The resultant product ("Polyamine A") had a viscosity at 23° C. of 17,000 mPas.

EXAMPLES

The following materials were used:
POLYAMINE A: as described above.
POLYAMINE B: an aliphatically bound amine-terminated polyoxypropylene, having a functionality of 2 and a molecular weight of 2000, available from Texaco as Jeffamine D-2000.
POLYAMINE C: an aliphatically bound amine-terminated polyoxypropylene, having a functionality of 3 and a molecular weight of 5000, available from Texaco as Jeffamine T-5000.
POLYOL A: a neopentylglycol/adipic acid polyester diol available from Witco as Formez 55-112, having an OH number of 112.
POLYOL B: a glycerin/propylene oxide adduct having an OH number of 1058.
POLYOL C: a 395 OH number polyol prepared by sequentially reacting 1 mole of a mixture of 2,3- and 3,4-toluene diamine with about 3.5 moles of ethylene oxide and then with about 4.5 moles of propylene oxide.
DC-193: a polysiloxane surfactant available from Dow Corning.

PC-8: Polycat 8: N,N-dimethylcyclohexlyamine, available from Air Products.

tensile (ASTM D-638). In addition, samples were tested for flammability perfomance according to UL-94.

TABLE 1

| | FORMULATIONS | | | | | | | | |
|---|---|---|---|---|---|---|---|---|---|
| Example | 1 | 2 | 3 | 4 | 5 | 6 | 7 | 8 | 9 |
| Component B: | | | | | | | | | |
| POLYOL A | — | — | 13 | 13 | 15 | 15 | 13 | 13 | 13 |
| POLYOL B | 40 | 40 | 50 | 50 | 50 | 50 | 40 | 40 | 40 |
| POLYOL C | 32 | 32 | 12 | 12 | — | — | 27 | 27 | 27 |
| POLYAMINE A | — | 28 | 25 | — | — | 35 | — | — | 20 |
| POLYAMINE B | — | — | — | — | — | — | 20 | — | — |
| POLYAMINE C | 28 | — | — | 25 | 35 | — | — | 20 | — |
| DC-193 | 3 | 3 | 3 | 3 | 3 | 3 | 3 | 3 | 3 |
| PC-8 | 1 | 1 | 1 | 1 | 1 | 1 | 1 | 1 | 1 |
| UL-28 | 0.4 | 0.4 | 0.4 | 0.4 | 0.4 | 0.4 | 0.4 | 0.4 | 0.4 |
| A-19 | 21 | 21 | 21 | 21 | 21 | 21 | 21 | 21 | 21 |
| SALT | 3.5 | 3.5 | 3.5 | 3.5 | 3.5 | 3.5 | 3.5 | 3.5 | 3.5 |
| DC-1248 | 1 | 1 | 1 | 1 | 1 | 1 | 1 | 1 | 1 |
| Component A: | | | | | | | | | |
| ISO | 100 | 100 | 100 | 100 | 100 | 100 | 100 | 100 | 100 |
| Weight ratio | | | | | | | | | |
| A/B | 1.1 | 1.1 | 1.22 | 1.17 | 1.08 | 1.11 | 1.08 | 1.08 | 1.08 |

TABLE 2

| | PROPERTIES | | | | | | | | |
|---|---|---|---|---|---|---|---|---|---|
| Example | 1 | 2 | 3 | 4 | 5 | 6 | 7 | 8 | 9 |
| Density, g/cm$^3$ | 1.1 | 1.1 | 1.1 | 1.1 | 1.1 | 1.1 | 1.1 | 1.1 | 1.1 |
| Izod, N-mm/mm | 484 | 621 | 392 | 348 | 191 | 446 | 316 | 446 | 572 |
| Flex Mod. N/mm$^2$ | 1890 | 2100 | 2079 | 2002 | 1855 | 1855 | 2317 | 2072 | 2303 |
| Flex Str. N/mm$^2$ | 76 | 83 | 79 | 74 | 63 | 67 | 84 | 77 | 87 |
| Tensile N/mm$^2$ | 48 | 52 | 47 | 44 | 32 | 43 | 48 | 48 | 51 |
| % Elongation | 15 | 14 | 13 | 12 | 9 | 21 | 9 | 11 | 17 |
| Heat sag, 1 hr. 10 cm, 121° C., mm. | 4 | 5 | 6 | 13 | 16 | 14 | 19 | 14 | 14 |
| UL-94 Rating | fail | fail | V-0 | V-0 | V-1 | V-0 | NT | NT | NT |

UL-28: dimethyltin dilaurate, available from Witco.

A-19: Antiblaze 19: a cyclic phosphate ester flame retardant, available from Albright & Wilson.

SALT: a release agent formed by reacting 12 parts of 2-(1-heptadecyl)-3-(2-hydroxyethyl)-2-imidazoline and 88 parts of Q27119, a mercaptosilicone copolymer available from Dow Corning. The salt is prepared as described in U.S. Pat. No. 4,764,540.

DC-1248: a silicone copolymer available from Dow Corning.

ISO: a polymethylene poly(phenyl isocyanate) having an NCO content of 32.5% by weight, a diisocyanate content of about 60% and a viscosity at 25° C. of 50 to 100 cps, and commercially available from Miles Inc as Mondur MR-5.

RIM plaques were prepared using a laboratory piston metering unit and a clamping unit. The metering unit was a two component instrument having a maximum metering capacity of 12 liters. A rectangular mold, 760 mm×380 mm×3 mm was used to mold the samples under the following conditions:

| Component A temperature (iso) | 35° C. |
|---|---|
| Component B temperature | 35° C. |
| Isocyanate Index | 110 |
| Mold temperature | 75° C. |
| Demold time | 45 sec |

The formulations used and the physical properties were as indicated in the following tables. The samples were tested for density (ASTM D-1622), flex properties (ASTM D-790), elongation (ASTM D-638), heat sag (ASTM D-3769), unnotched Izod (ASTM D-256), and tensile (ASTM D-638). In addition, samples were tested for flammability perfomance according to UL-94.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a reaction injection molded elastomer comprising injecting a reaction mixture into a closed mold via a RIM machine, with the ratio of components being such that the isocyanate index is from about 70 to 130, wherein said reaction mixture comprises:

a) an organic di- and/or polyisocyanate, b) an isocyanate reactive mixture comprising:

1) from 30 to 70 parts by weight of a hydroxyl functional organic material which does not contain any nitrogen atoms and which contains from 3 to 4 hydroxyl groups and having a molecular weight below 350, 2) from 0 to 35 pads by weight of a hydroxyl functional material containing from 1 to 4 hydroxyl groups and having a molecular weight of from 284 to 602, and prepared by reacting an amine-group containing material selected from the group consisting of aromatic monoamines, aliphatic monoamines, aromatic diamines, aliphatic diamines, monoalkanol amines, dialkanolamines, or mixtures thereof with one or more alkylene oxides, 3) from 0 to 15 parts by weight of a polyester diol prepared by reacting an aliphatic carboxylic acid with an aliphatic diol, said polyester having an OH number of from about 60 to about 250, and 4) from 15 to 40 parts by weight of a compound of the formula:

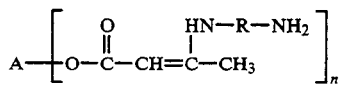

wherein

A represents the polyfunctional radical left by the removal of the hydroxyl groups from a polyol of molecular weight of from 62 to 12,000 and functionality n, R represents a hydrocarbon radical, and n is an integer of from 2 to 6.

2. The process of claim 1, wherein said component b) 1) is used in an amount of from 30 to 55 parts by weight, said component b) 2) is used in an amount of from 25 to 35 parts by weight, said component b) 3) is used in an amount of from 10 to 15 parts by weight and said component b) 4) is used in an amount of from 20 to 30 pads by weight.

3. The process of claim 2, wherein the OH number of said polyester diol is from about 112 to about 225.

4. The process of claim 2, wherein said polyol used to prepare component b) 4) has a molecular weight of from about 800 to about 3500, and wherein n is an integer of from 2 to 4.

* * * * *